United States Patent [19]

Cucchi et al.

[11] Patent Number: 5,025,460
[45] Date of Patent: Jun. 18, 1991

[54] SYSTEM AND CIRCUITS FOR THE PROCESSING AND TRANSMISSION OF A CLOCK SIGNAL, IN PARTICULAR OF THE VIDEO SYNCHRONIZATION FREQUENCY

[75] Inventors: Silvio Cucchi, Gaggiano; Stefano Carbone, Milan, both of Italy

[73] Assignee: Telettra-Telefonia Elettronica e Radio S.p.A., Milan, Italy

[21] Appl. No.: 365,846

[22] Filed: Jun. 14, 1989

[30] Foreign Application Priority Data

Jun. 14, 1988 [IT] Italy ............................. 20952 A/88

[51] Int. Cl.$^5$ ............................................. H04B 1/10
[52] U.S. Cl. ................................. 375/118; 328/162; 307/520
[58] Field of Search ............ 375/107, 110, 111, 118, 375/99; 328/155, 162, 165; 307/527, 520

[56] References Cited

U.S. PATENT DOCUMENTS

| 4,131,856 | 12/1978 | Chapman | 328/155 |
| 4,466,111 | 8/1984 | Bennett | 375/111 |
| 4,563,637 | 1/1986 | De Bortoli et al. | 375/118 |
| 4,740,998 | 4/1988 | House | 375/118 |
| 4,769,760 | 9/1988 | Kroll et al. | 307/527 |
| 4,796,280 | 1/1989 | Nesin et al. | 375/110 |
| 4,815,109 | 3/1989 | Kao | 375/107 |
| 4,868,854 | 9/1989 | Imai et al. | 328/155 |

Primary Examiner—Douglas W. Olms
Assistant Examiner—Stephen Chin
Attorney, Agent, or Firm—Ostrolenk, Faber, Gerb & Soffen

[57] ABSTRACT

A system for processing and transmitting a clock signal, in particular the video synchronization frequency Fsr, in order to obtain a binary flow with pre-fixed and desired speed, e.g. a flow at 64 Kb/s. The system can survey the jitter of Fsr and determine its value, using this value to suitably condition the information flow at output. In a typical application, this information, together with a video/audio signal, forms four musical channels and, with low speed, flows to the inputs of a circuit that carries out multiplexing at 34368 Kb/s, according to the European standard. This multiplexer operating at 34368 Kb/s can be advantageously used in systems and equipment for the processing of the television signal using mono or bidimensional transformation coding to obtain a high compression of the information to be transmitted.

9 Claims, 7 Drawing Sheets

SYSTEM AND CIRCUITS FOR THE PROCESSING AND TRANSMISSION OF A CLOCK SIGNAL, IN PARTICULAR OF THE VIDEO SYNCHRONIZATION FREQUENCY

BACKGROUND OF THE INVENTION

1. Field of the Invention

The present invention relates to the processing of a video synchronization signal and, more specifically, to systems for the processing and transmission of a clock signal having a period $1/Fsr$ and a subject to "jitter", using a measure of the period $1/Fsr$ with the aid of a sample signal having a frequency $Fc$.

2. Description of the Related Art

Generally, to transmit the video frequency or the line frequency or the display frequency or a signal bound to these latter frequencies, a comparison is made between the magnitude of the signal frequency and a sample frequency at the receiver (typically the sample frequency is set at the frequency with which the data are transmitted).

Several well known methods for accomplishing this comparison are as follows:

direct sampling of the video frequency with the sampling frequency known by the receiver. The trouble is that, for the reconstructed signal to have low distortion, it is necessary to use a high bit rate.

phase comparison between the video frequency and the sampling frequency; the transmission occurs, e.g., by sending 0 (zero) with $-n \leq \phi < 0$ and 1 with $0 \leq \phi < \pi$, where $\phi$ is the phase angle. The drawbacks of this method are the variable bit rate and the difficulty of compressing the comparison jitter.

discrete measure of the video frequency period by means of the sample frequency. The drawback of this method is that, in the presence of the jitter, the information to be transmitted is of the multilevel type, that is, it increases the bit rate.

SUMMARY OF THE INVENTION

The present invention is based upon an adaptation of the third method described above in a manner which allows the transmission of minimum information (one bit) for each single period measurement, regardless of the presence of jitter on the video frequency (and, in general, regardless of the clock frequency that is transmitted).

The invention involves taking a discrete binary measurement of the ratio $Fc/Fsr$; the result of this measurement is processed according to the algorithm described below in which the jitter of the signal is compressed and discharged by means of the integration of an error, whereby a sole binary digit is still sufficient for each period of the clock signal.

The algorithm used in the invention is as follows: the video synchronism frequency is measured by means of a sampling frequency $Fc$; the ratio $Fc/Fsr$ is, in general, a decimal number n.m., that is a number between whole numbers n and n+1. Therefore, it is possible to convert the single measurement into a whole number equal to n or to n+1.

This result can be achieved, e.g. by means of a circuit that surveys the upward or downward slopes of $Fsr$ and initializes a counter at O at a certain slope; this counter, that increments at frequency $Fc$, supplies the measurement, i.e., the value of the counting end, that shall be thus n or n+1.

The transmission occurs; a O is transmitted the case in which the counting ends at n, and a 1 is transmitted in the case when the counting ends at n+1. All these considerations are valid when $Fsr$ is a nominal value.

However, in the presence of the jitter in $Fsr$, the measurement or the counting can have values different from n and n+1.

Instead of transmitting the actual value of where counting ends, (a number of bits > 1), the invention only transmits n or n+1, based upon whether counting ends at a value $\leq n$ or $\geq n+1$, and it is calculated a final error as the actual counting −n, or n+1, according to what it is transmitted.

The error, a quantity with sign, is added to the value of the counting end of the following cycle; this latter magnitude determines whether it is suitable to transmit n or n+1.

DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE PREFERRED EMBODIMENT

Figure 1:
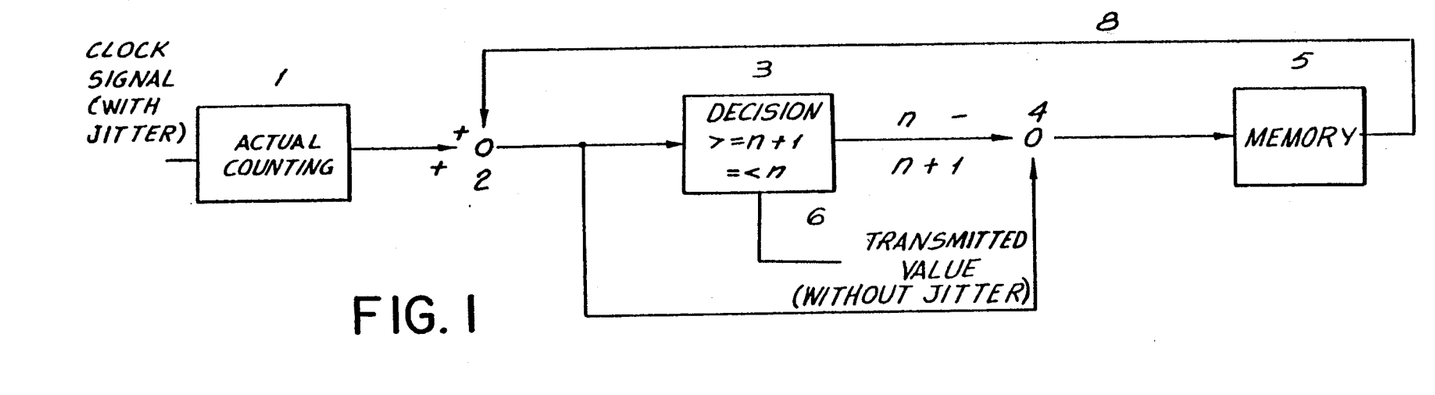
FIG. 1 is a block diagram of the overall invention.

The block scheme of the invention is illustrated in FIG. 1, where in 1 the actual counting is carried out; in 2, the addition between counting and error is carried out; in 3, the decision is made, in 4 the difference between addition and value transmitted in 6 is determined in 5, this difference is stored as the error 7, that is reapplied to the adder 2 by means of loop 8.

For example, having as cumulated a negative error (n being transmitted) it is necessary to bring the error back towards positive values, that the counting end at values $\geq n+1$, while n is still being transmitted.

Thus:

| Trasm. value | ... | n | n+1 | n | n | n | n | n | n | n | n | n | n | n+1 |
|---|---|---|---|---|---|---|---|---|---|---|---|---|---|---|
| actual counting | ... | n | n+1 | n | n−1 | n−1 | n−2 | n | n | n+1 | n+2 | n+1 | n | n+1 |
| error | ... | | | | | −2 | −4 | −4 | −4 | −3 | −1 | 0 | 0 | 0 |

Therefore, having a bit for each period of $Fsr$, the remote terminal can reconstruct, on the average, the video synchronization frequency.

Proper reconstruction is possible due to the integration of the error caused by the jitter and due to the compression of the jitter.

U.S. Pat. No. 4,894,710 discloses a system for the processing of the television signal based upon mono- or bidimensional transformation coding to obtain a high compression of the information to be transmitted. The following description refers to a circuit implementation for the multiplexer, e.g. operating at 34368 Kb/s, used in the system of U.S. Pat. No. 4,898,710.

The counter for measuring the video synchronization frequency does not carry out a counting from 0 up to n or at n+1; it is preferred, to simplify the circuit, to use a five-bit counter that is saturated many times in a period of Fsr.

Further, to simplify the arithmetics, it is desired that the counting end nominally at 15 or 16: this requires that the counter be initialized at a particular value calculated according to Fsr and Fc. For example, if Fsr is 31250 Hz (2×15625) and Fc is 4.296 MHz, it is necessary to count 137 or 138 clock strokes at Fc frequency, then to initialize the counter at 7, so that the counting ends at 15 or 16. To take consideration of the jitter of Fsr and the value of Fc, counting must end at values included between 3 and 28; in the other cases, where counting is equal to 0, 1 and 2 or 29, 30 and 31, an alarm signals indicating an out of limit condition.

To always consider the allowed jitter, it is assumed that, in conditions of correct functioning, the accumulated error is included between −31 and 31; an overflow situation exists if the actual counting + error $\geq 48$, or an underflow condition exists if the actual counting +error $\leq -17$. Both overflow and underflow situations generate an alarm signaled to the outside.

In the case of overflow and underflow, the result of the addition is controlled so that it occurs as follows:

$$-16 \leq \text{controlled addition} \leq 47$$

Figure 2:
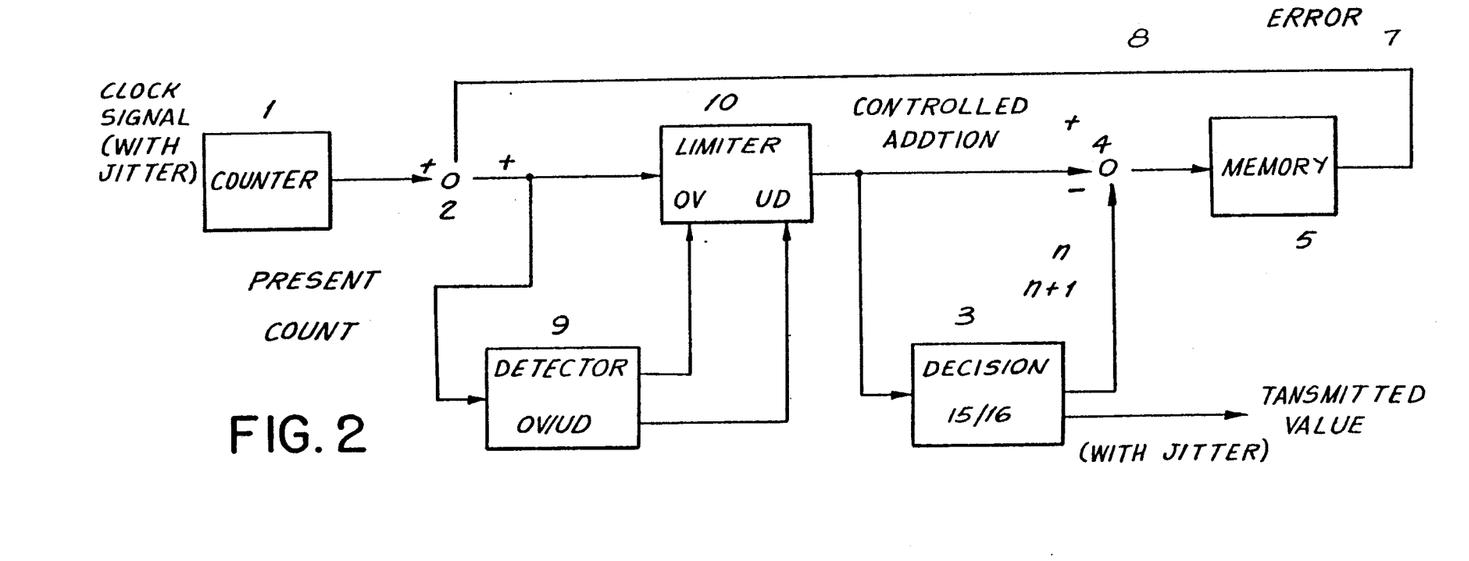
FIG. 2 is a block diagram of the invention with overflow and underflow detection.
Figure 3A:
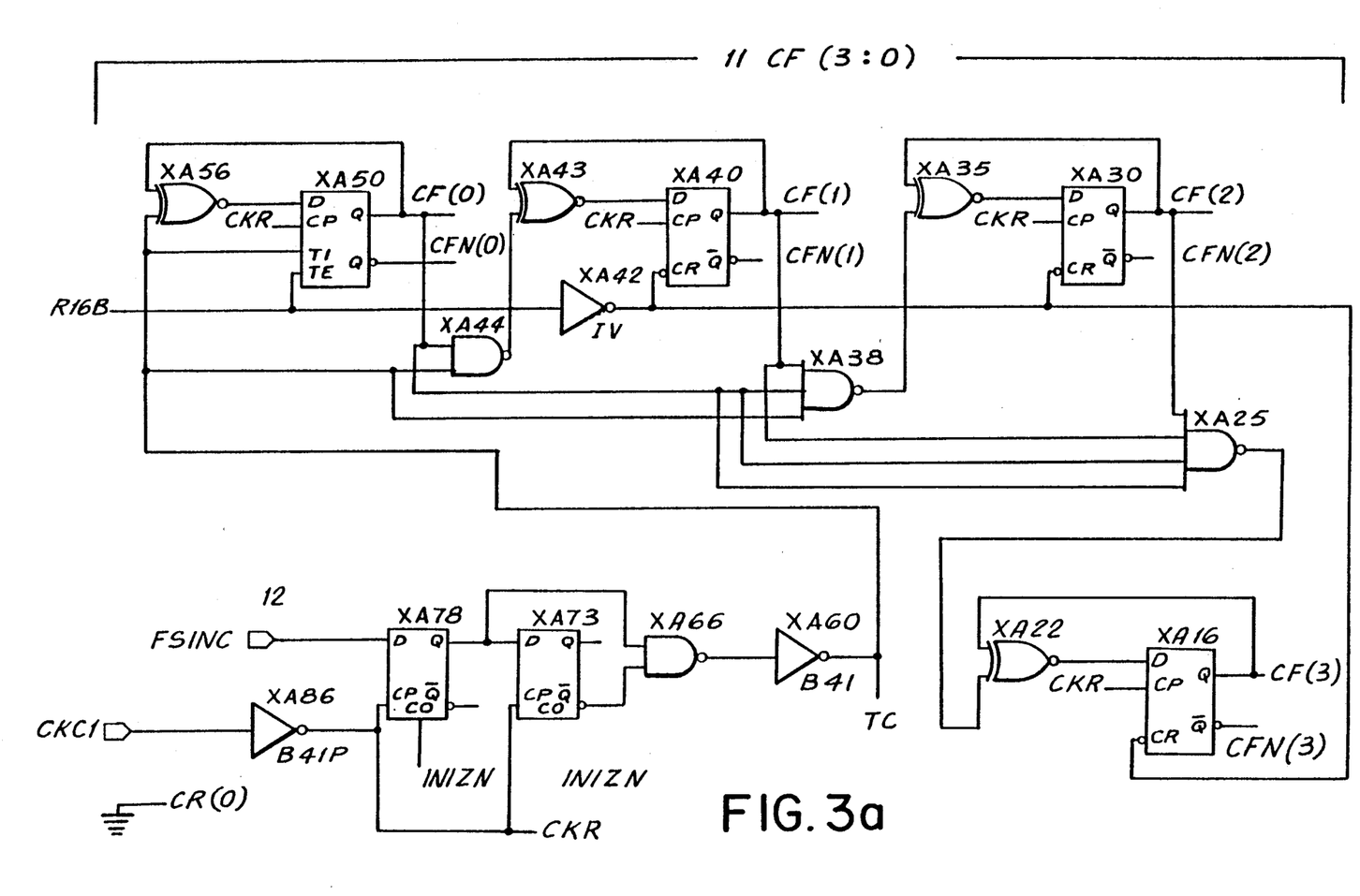
FIG. 3 is a detailed schematic view of the circuitry of the invention.
Figure 3B:
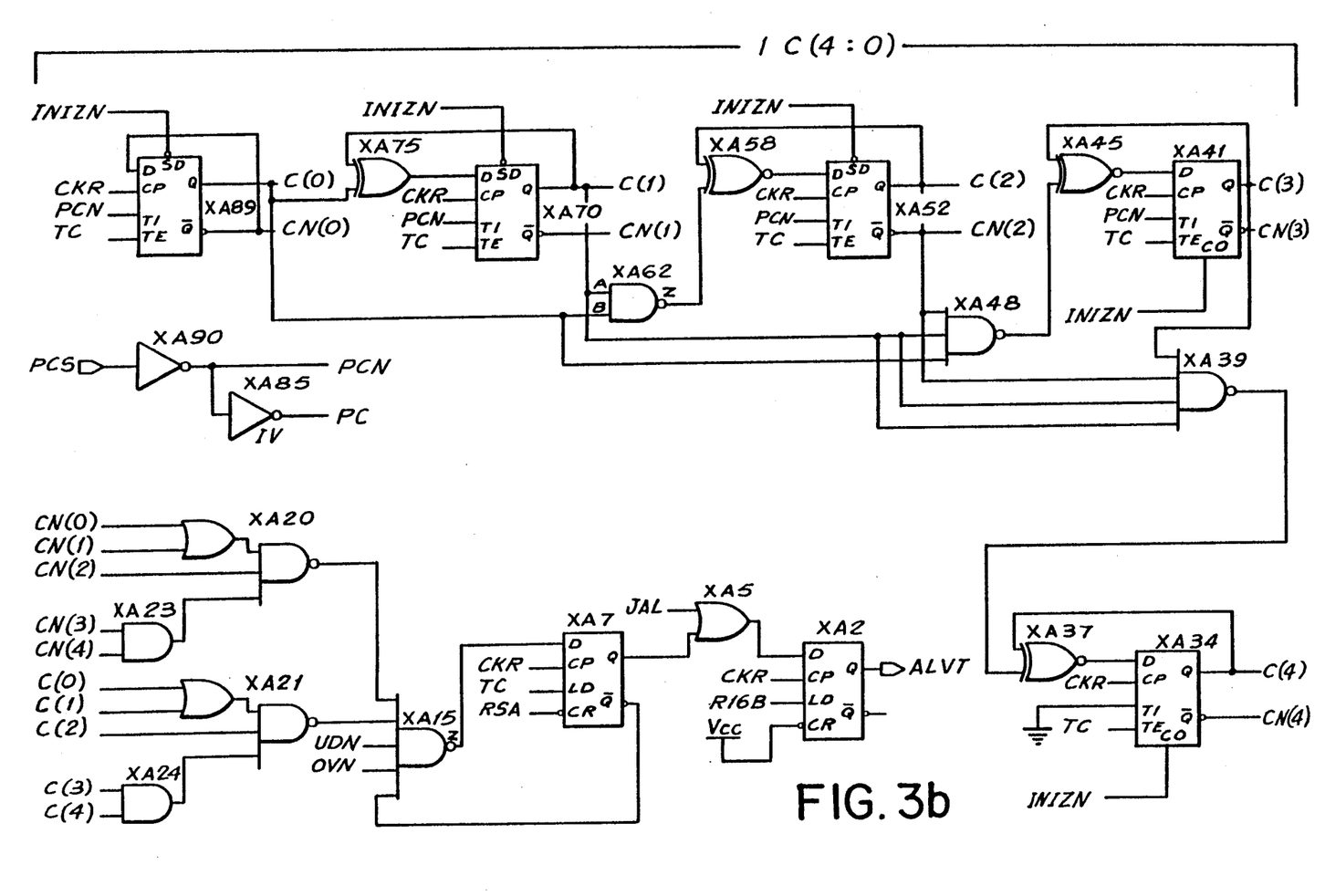
Figure 3C:
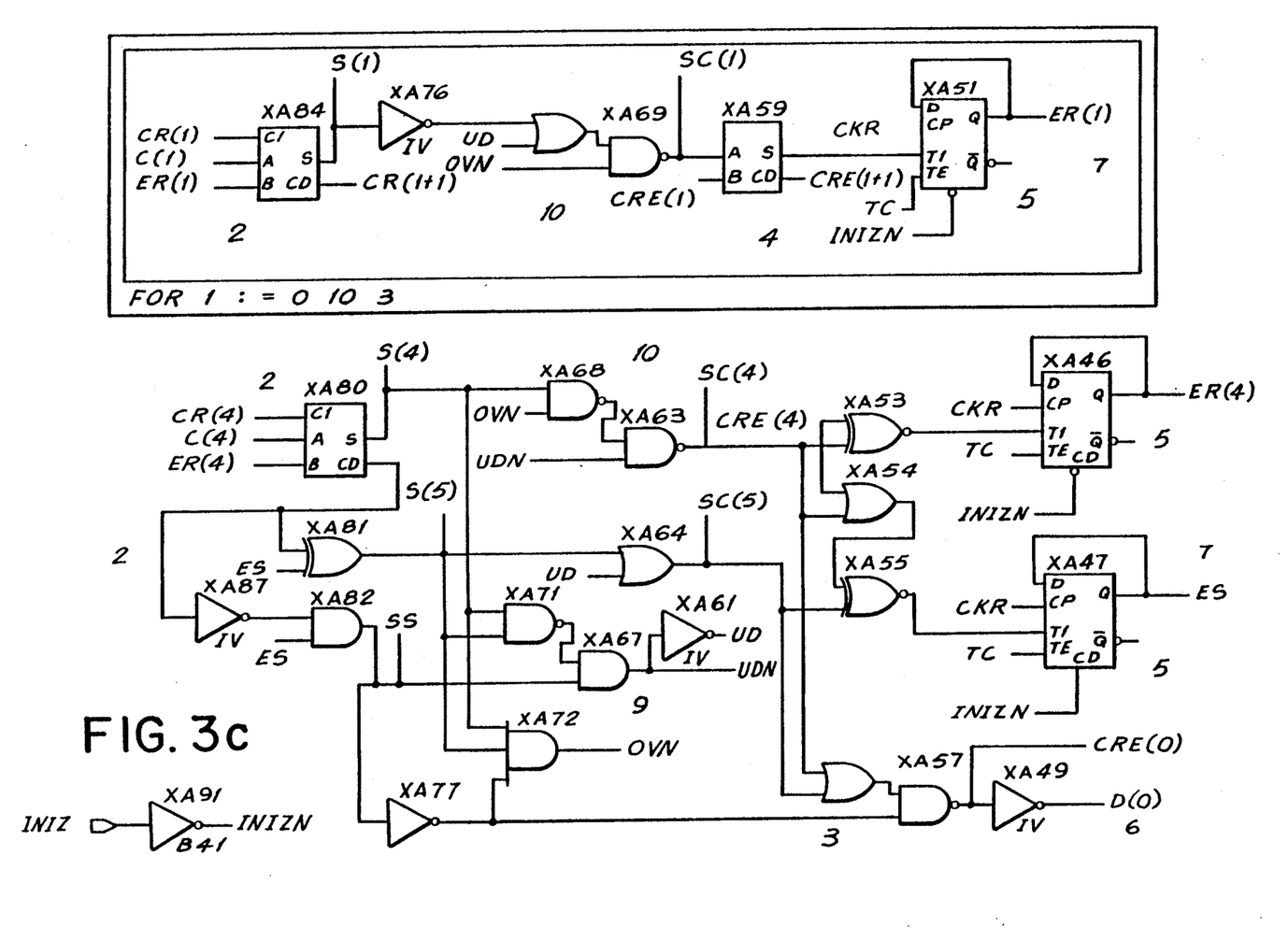
Figure 3D:
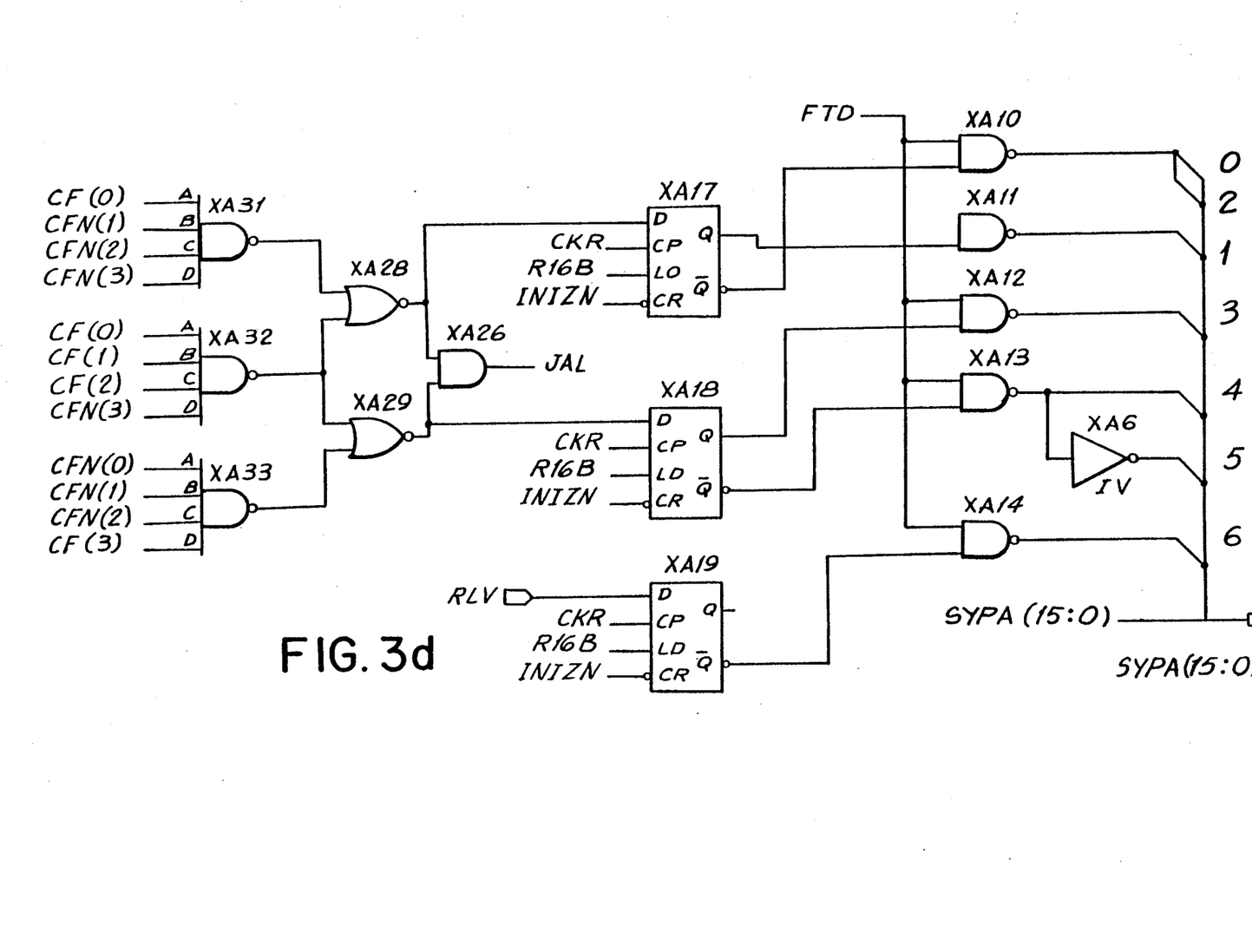
Figure 3E:
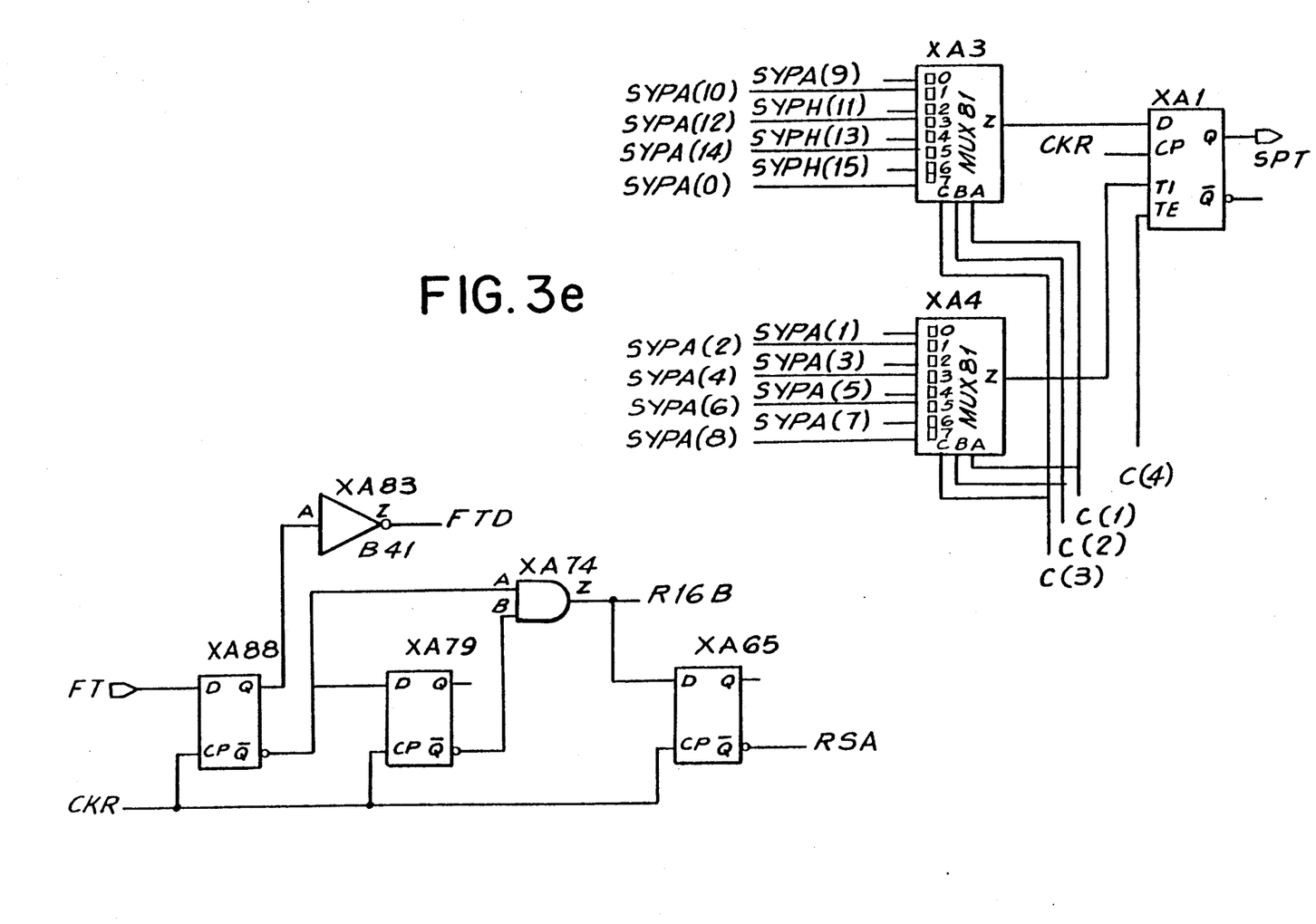
Figure 3F:
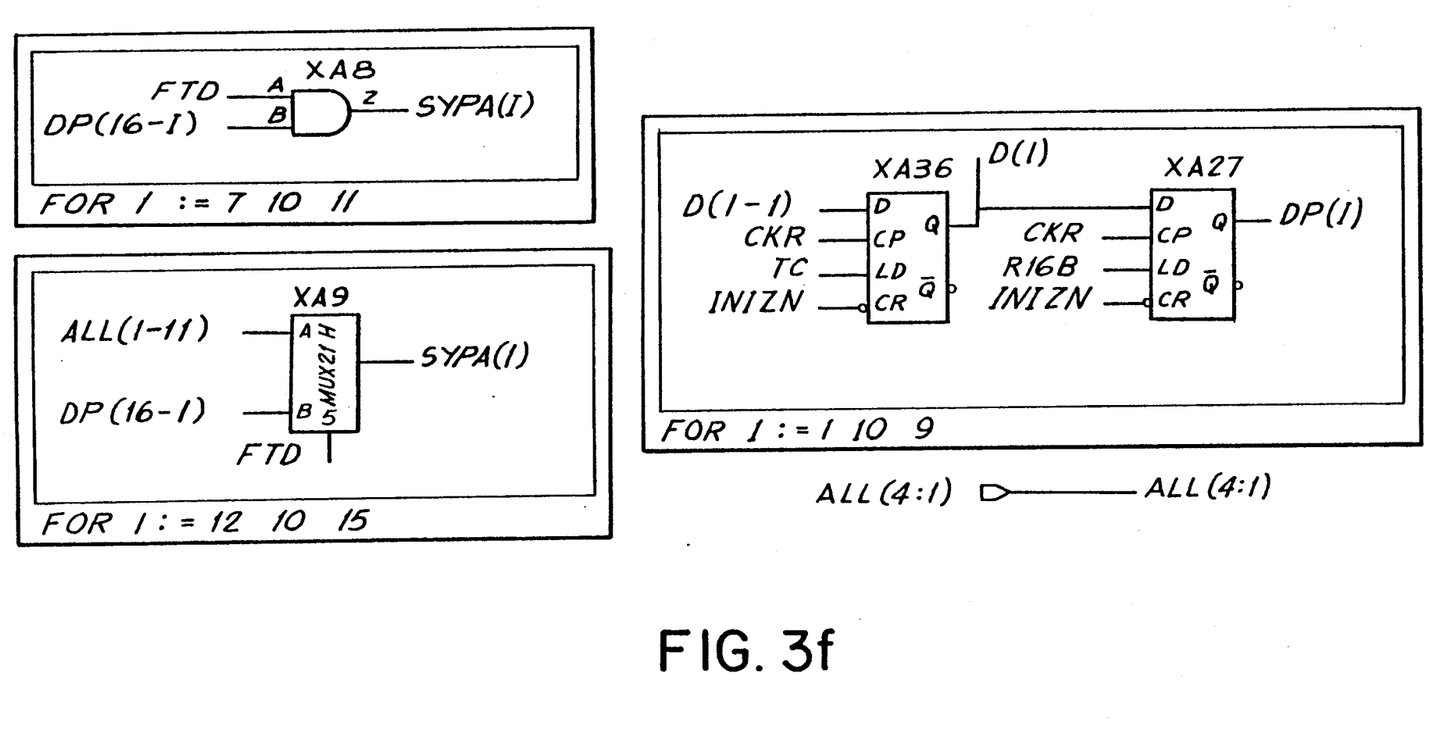

The consequent block scheme is indicated in FIG. 2. Further, another counter is used (e.g. as identified by reference number 11 in the FIG. 3) that counts the number of transitions of the video synchronization frequency in a pre-determined interval, in particular in the network period of the multiplexer.

On the basis of the jitter of Fsr and of the frame frequency, that in this case is 4 KHz, the number of transitions can be 7, 8 or 9; in any other case, an alarm signals.

This last information that requires two bits to be transmitted, is protected by transmitting a suitable coding of six bits (e.g. using the circuit identified by reference numeral 13 in FIG. 3); in reception, it is recovered with a decision at majority two/three.

Finally, always nine information bits are transmitted, of which the bits 7, 8 or 9 will be significant on the basis of the indication of the six bits obtained by the transition counter, and one external alarm bit coming from the plate that supports the circuit. Therefore, 16 information bits flow on one frame at 4 KHz for a total flow at 64 KHz.

FIG. 3 illustrates in detail the circuit construction of this particular embodiment.

This figure shows the counter 1 with five bits C0, C1, C2, C3 and C4 for the measurement, the counter 11 with four bits CF0, CF1, CF2, and CF3 for counting the transitions of the video synchronization frequency FSINC in the frame period and the circuit 12 that surveys the transitions (the slope fronts) of FSINC. Central to the scheme is the circuit that carries out the real algorithm: the adder 2 that carries the algebraic addition (it uses a complementary two's representation of the negative numbers) of the counting 1 and of the error 7 ES, ER4, ER3, ER2, ER1 and ER0, followed by the limiter 10 controlled by the signals UD and OVN; the limiter is followed by the adder 4, of the controlled addition and the transmitted datum D (0), whose output forms the future error.

The logic circuit 16, necessary for the coding of the transition number of FSINC in the main frame period and for the preparation of 16 bits SYPA (15:0) to be sent into the frame, completes the present embodiment.

Obviously, the invention has been described for clarity's sake with reference to the drawings and examples, but it is not limited to these embodiments as it is susceptible of changes and modifications which, being within the reach of the person ordinarily skilled in the art, fall naturally within the spirit and scope of the following claims.

What is claimed is:

1. A method for the processing and transmission of a clock signal affected by jitter, said clock signal having a period 1Fsr, where Fsr is the frequency of the clock signal, by measuring said period with a sample signal having a frequency Fc, said method comprising the steps of:
    taking a discrete binary measurement of the ratio Fc/Fsr;
    processing said discrete binary measurement of the ratio Fc/Fsr to compress and discharge the jitter in the signal by using a circuit with a feedback loop to feed back error introduced by the jitter and thereby accumulate and integrate said error introduced by the jitter; and
    generating a single binary digit 0 or 1 based upon the sum of the discrete binary measurement of the ratio Fc/Fsr and the error fed back by said feedback loop, said single binary digit 0 to 1 adequately representing each period of the clock signal.

2. The method of claim 1, wherein a binary 0 is generated in said step of generating when the sum of the discrete binary measurement of the ratio Fc/Fsr and the error fed back by said feedback loop is $\leq n$, where n is a whole number, and a binary 1 is generated when the measured value is $\geq n+1$.

3. The method of claim 1, wherein a binary 1 is generated when the sum of the discrete binary measurement of the ratio Fc/Fsr and the error fed back by said feedback loop is $\leq n$, where n is a whole number, and a binary 0 is generated when the measured value is $\geq n+1$.

4. The method of claim 1, further comprising the step of detecting an overflow and underflow of the algebraic addition of the instantaneous measurement of the period and accumulated error, and generating an alarm signal upon detecting an overflow or underflow.

5. A circuit for processing and transmitting a clock signal affected by jitter, said clock signal having a period 1Fsr, where Fsr is the frequency of the clock signal, by measuring said period with a sample signal having a frequency Fc, said circuit comprising:
    means for taking a binary measurement of the ratio Fc/Fsr; and
    means for applying an algorithm to said ratio Fc/Fsr to compress and discharge the jitter, comprising a feedback loop in said circuit for feeding back error introduced by said jitter, thereby accumulating and integrating error introduced by said jitter; and
    means for generating a single binary digit 0 or 1 based upon the sum of the discrete binary measurement of the ratio Fc/Fsr and the error fed back by said feedback loop, said single binary digit 0 or 1 adequately representing each period of the clock signal.

6. A circuit as recited in claim 5, wherein the period of the clock signal 1Fsr, is measured by a saturation counter.

7. A circuit as recited in claim 6, wherein the ratio Fs/Fsr is determined by counter which counts the number of transitions of said saturation counter, corresponding to the number of transitions of said clock signal, within a predetermined time interval.

8. A circuit as recited in claim 6, wherein said means for applying an algorithm comprises an adder for conducting an algebraic addition of the output of said saturation counter, corresponding to the period of the said clock signal, with said accumulated and integrated error.

9. A circuit as recited in claim 8, further comprising an alarm for indicating an underflow or overflow of said adder.

* * * * *